(12) United States Patent
Wortham

(10) Patent No.: US 9,787,118 B2
(45) Date of Patent: Oct. 10, 2017

(54) SIMPLE AND HIGH EFFICIENCY BALANCING CIRCUITS AND METHODS FOR HYBRID BATTERIES

(71) Applicant: Maxim Integrated Products, Inc., San Jose, CA (US)

(72) Inventor: Jason Allen Wortham, Fremont, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 449 days.

(21) Appl. No.: 14/170,033

(22) Filed: Jan. 31, 2014

(65) Prior Publication Data

US 2014/0145669 A1 May 29, 2014

Related U.S. Application Data

(63) Continuation of application No. PCT/US2012/049219, filed on Aug. 1, 2012.
(Continued)

(51) Int. Cl.
*H02J 7/00* (2006.01)
*H02J 7/04* (2006.01)
(Continued)

(52) U.S. Cl.
CPC ......... *H02J 7/0054* (2013.01); *H01M 10/425* (2013.01); *H01M 10/4207* (2013.01);
(Continued)

(58) Field of Classification Search
CPC .................................................... H02J 7/0054
(Continued)

(56) References Cited

U.S. PATENT DOCUMENTS 6,271,645 B1 * 8/2001 Schneider ............. H02J 7/0014
320/118
7,126,310 B1 10/2006 Barron
(Continued)

FOREIGN PATENT DOCUMENTS

| CN | 101065876 | 10/2007 |
| EP | 1536540 | 6/2005 |

OTHER PUBLICATIONS

"Office Action Dated Jul. 18, 2016; Chinese Patent Application No. 201280038495.6", (Jul. 18, 2016).
(Continued)

*Primary Examiner* — Richard V Muralidar
(74) *Attorney, Agent, or Firm* — Blakely Sokoloff Taylor & Zafman LLP

(57) ABSTRACT

A balancing circuits and methods for hybrid batteries having two different rechargeable batteries that are coupled in series includes coupling a fuel gauge to each battery to determine the state of charge of each battery, comparing the state of charge of the two batteries, and if the state of charge of the two batteries is more than a predetermined difference, then enabling a switching converter to source current to a node between the batteries or to sink current from the node between the batteries, as required to tend to equalize the state of charge of the two batteries. Otherwise, if the state of charge of the two batteries is equal within a predetermined allowance, then disabling the switching converter.

25 Claims, 1 Drawing Sheet

Related U.S. Application Data

(60) Provisional application No. 61/513,986, filed on Aug. 1, 2011.

(51) Int. Cl.
  *H01M 10/42* (2006.01)
  *H01M 10/44* (2006.01)
  *H01M 10/48* (2006.01)

(52) U.S. Cl.
  CPC ....... *H01M 10/441* (2013.01); *H01M 10/482* (2013.01); *H02J 7/0003* (2013.01); *H02J 7/0016* (2013.01); *H01M 2010/4271* (2013.01)

(58) Field of Classification Search
  USPC ........ 320/103, 116, 118, 119, 128, 132, 134, 320/140
  See application file for complete search history.

(56) References Cited

U.S. PATENT DOCUMENTS

| | | | |
|---|---|---|---|
| 7,180,275 B2 * | 2/2007 | Reithmaier | H02M 3/156 323/222 |
| 8,198,863 B1 | 6/2012 | Wortham | |
| 8,203,305 B1 | 6/2012 | Wortham et al. | |
| 2004/0128086 A1 | 7/2004 | Barsoukov et al. | |
| 2005/0017682 A1 | 1/2005 | Canter et al. | |
| 2006/0097698 A1 | 5/2006 | Plett | |
| 2011/0241625 A1 * | 10/2011 | LoCascio | H02J 7/0052 320/140 |

OTHER PUBLICATIONS

"Office Action Dated Nov. 2, 2015; Chinese Patent Application No. 201280038495.6", (Nov. 2, 2015).

"Application Note 131, Lithium-Ion Cell Fuel Gauging with Maxim Battery Monitor ICs", Maxim Integrated Products Homepage, (Mar. 29, 2001), pp. 1-11.

"International Search Report and Written Opinion of the International Searching Authority Dated May 2, 2013; International Application No. PCT/US2012/049219", (May 2, 2013).

"Invitation to Pay additional Fees with Partial International Search Report Dated Nov. 9, 2012; International Application No. PCT/US2012/049219", (Nov. 9, 2012).

Wagner, Reinhardt, "Application Note 3958, Battery Fuel Gauges: Accurately Measuring Charge Level", Maxim Integrated Products Homepage, (Dec. 22, 2006), pp. 1-8.

Wikipedia, "Masse (Elektronik)", http://de.wikipedia.org/wiki/Masse_(Elektronik), (May 13, 2012), 3 pp. total.

Maxim Integrated Products, Inc., "MAX1684/MAX1685 Low-Noise, 14V Input, 1A, PWM Step-Down Converters", (Apr. 1999), pp. 1-16.

"Office Action Dated Jan. 23, 2017; Chinese Patent Application No. 201280038495.6", (Jan. 23, 2017).

"Notice of Granting Patent Right for Invention dated Jul. 27, 2017; Chinese Patent Application No. 201280038495.6", (dated Jun. 27, 2017).

\* cited by examiner

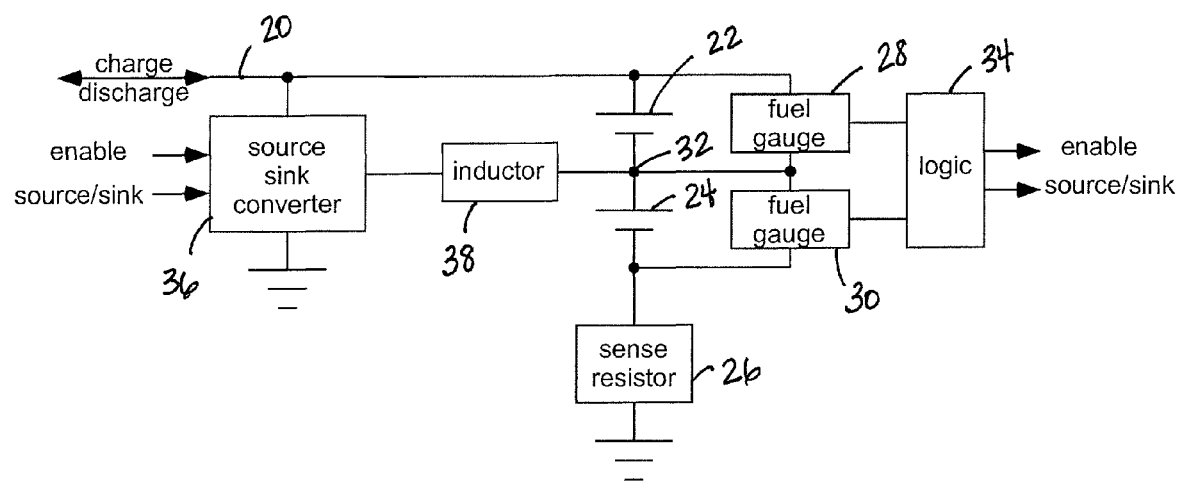

SIMPLE AND HIGH EFFICIENCY BALANCING CIRCUITS AND METHODS FOR HYBRID BATTERIES

CROSS-REFERENCE TO RELATED APPLICATIONS

This application is a continuation of International Application No. PCT/US2012/049219 filed Aug. 1, 2012 which claims the benefit of U.S. Provisional Patent Application No. 61/513,986 filed Aug. 1, 2011.

BACKGROUND OF THE INVENTION

1. Field of the Invention

The present invention relates to the field of fuel gauges monitoring the state of charge of rechargeable batteries.

2. Prior Art

In order to meet the market demand to design a very thin Tablet or notebook computer, a battery pack may need to mix cells of different capacities in series or parallel to fit in a particular ID design. For example, a high capacity battery cell may need to be in series with a low capacity cell in the battery pack. When a charger is applied to this battery pack, the lower capacity cell would normally reach full (fully charged) faster than the higher capacity cell. When the system discharges the pack, if both cells started from the same state of charge, the lower capacity cell would normally reach empty (minimum state of charge) faster than the higher capacity cell. Thus for improved battery and notebook form-factor, notebook makers would like to mix and match different sized cells. This presents challenges both for power management and fuel gauging.

BRIEF DESCRIPTION OF THE DRAWINGS

FIG. 1 is a block diagram of an exemplary embodiment of the present invention.

DETAILED DESCRIPTION OF THE PREFERRED EMBODIMENTS

In order to maximize the battery capacity and avoid over charging and over discharging the lower capacity cell, the present invention balances the state of charge of these two different capacity cells during both charging and discharging cycles. More particularly, this invention provides a dual/hybrid fuel gauge and algorithm for directing power transfer between cells (using a source/sink switching convertor). This innovation solves the problem of power direction control between cells and also provides an excellent composite fuel gauge in spite of DC/DC inefficiency and non-matching cell chemistries and capacities during both charging and discharging.

The present invention tracks and distinguishes the state of charge of each cell in series. A buck convertor having both a current sourcing and current sinking capability is used to move energy from the top cell to the bottom cell (source mode) or from the bottom cell to the top cell (sink mode). In order to control the energy flow direction, two independent fuel gauge engines distinguish the state of charge of each cell. Energy direction control is chosen to move energy from the cell with the highest state of charge to the cell with the lowest state of charge. When the cells are close in state-of-charge, the DC/DC is shut down to minimize consumption.

Providing an accurate composite Fuel gauge can be challenging because there is only a single sense resistor to fuel gauge all cells, rather than a sense resistor for each cell. In addition, the DC/DC's inefficiency corrupts the principle of conservation of charge, since there is net charge lost during power conversion. The method manages charge lost by usage of a voltage based fuel gauge subsequently described more fully herein, and this extra information overcomes the current difference in and/or capacity of each cell as well as the charge lost by DC/DC inefficiency.

A DC/DC converter has some inefficiency, which prevents conservation-of-charge. Conservation-of-charge is a critical requirement for most existing fuel gauges. This is a first-order compensation considering the estimated input and output current of the DC/DC when sourcing and sinking.

Now referring to FIG. 1, a block diagram illustrating the present invention may be seen. The main power line 20 is coupled to batteries 22 and 24 connected in series and coupled to ground through a sense resistor 26. First and second fuel gauges 28 and 30 are each coupled across a respective one of batteries 22 and 24 to monitor the state of charge of the respective battery. In a preferred embodiment these fuel gauges are voltage based fuel gauges generally are in accordance with U.S. Pat. No. 8,198,863, and more preferably in accordance with U.S. Pat. No. 8,203,305. U.S. Pat. No. 8,198,863 discloses examples of what is referred to herein as voltage based fuel gauges, and more particularly voltage based fuel gauges wherein the state of charge is determined using a battery model and the battery terminal voltage without using a measure of the battery current. Using a battery model or equivalent is important, as simply using battery terminal voltage is highly inefficient as described below.

Fuel gauges of a type generally in accordance with U.S. Pat. No. 8,203,305 are particularly preferred as these fuel gauges efficiently combine a voltage based fuel gauge using a battery model, which provides excellent long term performance, and a Coulomb counter which provides good short term transient response but is subject to drift over time, particularly if a battery is not fully charged and/or not fully charged between cycles. These fuel gauges are manufactured and sold by Maxim Integrated Products, though other fuel gauges could be used if desired. Preferably, however, the fuel gauges used provide a reasonably accurate measure of the state of charge of the batteries as opposed to simply measuring terminal voltage of the battery, as two batteries of different capacities, even if of the same chemistries and equal states of charge, will have different terminal voltages when charging and when discharging because of different internal impedance of the batteries, so that inaccurate sensing of the state of charge of the batteries will result in excessive converter activity and inefficiency.

The Maxim Integrated Products fuel gauges which incorporate a Coulomb counter are basically devices that digitize the voltage across the sense resistor as a measure of the current and apply the same to the battery model in the digital domain. As such, fuel gauges of this general type have available a digitized value of the current through the sense resistor 26 which can be made available for both fuel gauges to use.

Assume as one example that the batteries 22 and 24 when having the same state of charge will have the same voltages across them, i.e., are of the same chemistry and have an equal number of cells. Accordingly the voltage on node 32 during a quiescent state when there is no charging or discharging of the batteries will be equal to one half the voltage on line 20. In this condition the logic block 34 coupled to the outputs of the fuel gauges 28 and 30 compares their state of charge and senses this equality of state of charge. It therefore disables the switching converter 36. The logic block may take various forms, such as, by way of example, as integrated logic or as hardware operating under program control, and may be integrated with one or both fuel gauges if desired, which themselves may be, by way of example, logic circuits or processor type devices operating under program control.

Now when the device coupled to line 20 is turned on, both batteries will start to reduce their state of charge, but if the capacity of battery 22 is less than the capacity of battery 24, the state of charge of battery 22 will reduce at a faster rate than that of battery 24. In one embodiment, when that difference becomes greater than 1% of a full charge, logic 34 senses that difference on the outputs of the fuel gauges 28 and 30 to turn on the converter 36 to sink current from node 32. This has the effect of drawing electrical energy from node 32 back through converter 36 to line 22 so that the current provided by battery 22 is reduced and that provided by battery 24 is increased to keep the outputs of the fuel gauges (state of charge) equal while supplying the required current to the device powered by the batteries, or at least within a predetermined difference.

On the other hand, during charging of the batteries the state of charge of battery 22 would normally increase faster than the state of charge of battery 24. This, again, is sensed by logic 34 sensing the developing difference in the state of charge of the batteries indicated by outputs of fuel gauges 28 and 30. In this mode, electrical energy from line 20 is diverted through the converter to node 32 to increase the charging current to battery 24 in comparison the that provided to battery 22 so that their rate of change of state of charge is equalized, thereby keeping their state of charge equal to within the predetermined tolerance. In that regard it is to be noted that the switching converter using inductor 38, neglecting losses for the moment, provides a current into node 32 that is not merely a direct coupling of current from line 20 but rather will be a current equal to the current into converter 36 times the voltage on line 20 divided by the voltage on node 32. Of course there will in fact be some losses, though switching converters are relatively efficient and as previously described the converter 36 will not be continuously operating, but operating only as needed.

The converter 36 used in one embodiment is the MAX1685 step down converter manufactured by Maxim Integrated Products, assignee to the present invention. This converter can both source and sink current, and as a current sink can be used to provide a negative output voltage, though of limited voltage. However, the voltage on node 32 never becomes negative so the ability of the converter 36 to sink current is not subject to any such negative voltage limitations when used in the present invention.

In the foregoing description it was assumed that the two batteries 22 and 24 were of the same chemistry but of different capacities. That, however, is not a limitation of the present invention. In particular, assume now that the batteries are not only of different capacities but are also of different chemistries (especially chemistry subvariants). Unlike batteries of the same chemistry but of different capacities, here the open circuit voltage (which indicates the state of charge of a battery) of the two batteries may be significantly different. Typically a rechargeable battery will have a predefined maximum charge and similarly a predefined minimum charge below which any system powered thereby will automatically shut down rather than to discharge the battery further. Thus there is a range of charge in the battery ranging from the predefined fully charged to the predefined fully discharged state. The state of charge represents the fraction of the useful charge remaining on the battery. Consequently, as long as the fuel gauges reasonably accurately measure the state of charge for each of the two batteries, preferably relatively independent of current flow, the present invention system will work properly, as the state of charge of a battery is independent of the battery chemistry.

Thus the key features of the DC/DC convertor used in one embodiment are:
1) Good peak efficiency, over 95%.
2) Internal switch with 1 A power capability.
3) Source and sink capability.
4) Adjustable current limit. By adjusting the current limit, one can design around peak efficiency.

Note that the lower capacity cell is the upper cell and the higher capacity cell is the lower cell in this embodiment. During charging, the state of charge of the lower (higher capacity) cell will lag the state of charge of the upper cell, so that the converter will operate in the sourcing mode, essentially diverting some current from the power supply to the lower cell (bypassing the upper cell) to slow the rate of change of the state of charge of the upper cell and to speed up the rate of change of the state of charge of the lower cell to maintain the state of charge of the two cells equal as they charge. During discharging of the battery pack, the converter is operated in the sink mode, in essence sinking energy from the lower cell back toward the input to the battery pack, which energy goes to the upper cell. If there is a difference in converter efficiency between sourcing and sinking energy (current) the order of the cell capacities in the battery pack should normally be chosen to maximize the overall efficiency during discharging of the battery pack (i.e. to maximize the useful battery life before another charge cycle is required).

The DC/DC circuit will have controls for the following modes:
1) Charging Mode (VF_OCVtop>VF_OCVbottom) (VF_OCV is the open-circuit voltage prediction of the fuel gauge). Power will be moved from the top cell(s) to the bottom cell(s) to keep the cells in balance during charging, since the smaller top cell will try to charge too quickly. In this mode, the buck convertor operates in source mode with a higher current limit, so that balancing can be achieved during fast charging.
2) Discharging Mode (VF_OCVbottom>VF_OCVtop). Power will be moved from the bottom cell(s) to the top cell(s) to keep balance during discharge, since the smaller top cell will try to empty too quickly. In this mode, the buck convertor operates in sink mode with a lower current limit, to optimize for DC/DC efficiency. If the MAX1684 buck converter is used, the buck convertor would be designed to sink 500 mA average, which is actually 250 mA from the bottom cell to the top cell (because of DC/DC power conversion equations). This will support a delta-capacity=1500 mAh (like 500 mAh in 3P cells) in 3 hours.

In some embodiments, some functions of the two state of charge sensing devices such as two ModelGauge engines may be combined in a single device that is smaller, less expensive to manufacture and has fewer contacts than two devices such as two ModelGauge engines of the present ModelGauge design.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A balancing circuit for a hybrid battery having at least two different rechargeable batteries coupled in series having one terminal coupled to ground through a sense resistor and one terminal coupled as a battery output of the two batteries comprising:
    a plurality of battery voltage based fuel gauges, one coupled to each battery for determining a state of charge of the respective battery;
    a logic block coupled to an output of each battery voltage based fuel gauge for determining when the state of charge of the two batteries is different;
    a switching converter coupled between the battery output and the ground and being capable of sourcing and sinking current, an input to the switching converter being coupled to an output of the logic block, an output of the switching converter being coupled to a junction between the two batteries without a sense resistor between the switching converter and the junction between the two batteries, the output of the switching converter being responsive to the output of the logic block causing the output of the switching converter to source or sink current as required to keep the two batteries at the same state of charge.

2. The balancing circuit of claim 1 wherein the batteries are of the same chemistries but of different capacities.

3. The balancing circuit of claim 1 wherein the batteries are of different chemistries.

4. The balancing circuit of claim 1 wherein the output of the logic block causes the output of the switching converter to source or sink current as required to keep the two batteries at the same state of charge within a predetermined difference.

5. The balancing circuit of claim 4 wherein the output of the logic block comprises first and second signals, the first signal being an enable signal to enable the switching converter and the second signal being a source/sink signal to cause the output of the switching converter to source or sink current.

6. The balancing circuit of claim 1 wherein the battery voltage based fuel gauges include a Coulomb counter.

7. The balancing circuit of claim 6 wherein the battery voltage based fuel gauges use a battery model.

8. A balancing circuit for a hybrid battery having at least two different rechargeable batteries coupled in series having one terminal coupled to ground and one terminal coupled as a battery output of the two batteries comprising:
    a plurality of battery voltage based fuel gauges, one coupled to each battery for determining a state of charge of the respective battery;
    a logic block coupled to an output of each battery voltage based fuel gauge for determining when the state of charge of the two batteries is different and providing an output having first and second signals, the first signal being an enable signal to enable a switching converter and the second signal being a source/sink signal to cause an output of the switching converter to source or sink current;
    the switching converter coupled between the battery output and the ground and being capable of sourcing and sinking current, inputs to the switching converter being coupled to the output of the logic circuitry, the output of the switching converter being coupled to a junction between the two batteries without a sense resistor between the switching converter and the junction between the two batteries, the output of the switching converter being responsive to the output of the logic block causing the output of the switching converter to source or sink current as required to keep the two batteries at the same state of charge within a predetermined difference.

9. The balancing circuit of claim 8 wherein the batteries are of the same chemistries but of different capacities.

10. The balancing circuit of claim 8 wherein the batteries are of different chemistries.

11. The balancing circuit of claim 8 wherein a sense resistor is coupled in series with the batteries, and wherein the battery voltage based fuel gauges include a Coulomb counter.

12. The balancing circuit of claim 11 wherein the battery voltage based fuel gauges use a battery model.

13. A method of balancing two different batteries that are coupled in series comprising:
    coupling a battery voltage based fuel gauge to each battery to determine a state of charge of each battery;
    comparing the state of charge of the two different batteries, and
    a) if the state of charge of the two different batteries is more than a predetermined difference, then enabling a switching converter to source current to a node between the two different batteries or to sink current from the node between the two different batteries without a sense resistor between the switching converter and the node between the two different batteries, as required to tend to equalize the state of charge of the two different batteries;
    b) if the state of charge of the two different batteries is equal within a predetermined allowance, then disabling the switching converter.

14. The method of claim 13 wherein the battery voltage based fuel gauges use a battery model and a Coulomb counter.

15. A balancing circuit for a hybrid battery having at least two different rechargeable batteries coupled in series having one terminal coupled to ground and one terminal coupled as a battery output of the two batteries comprising:
    a plurality of voltage based fuel gauges that each use a battery model, one coupled to each battery for determining a state of charge of the respective battery;
    a logic block coupled to an output of each battery voltage based fuel gauge for determining when the state of charge of the two batteries is different;
    a switching converter coupled between the battery output and the ground and being capable of sourcing and sinking current, an input to the switching converter being coupled to an output of the logic block, an output of the switching converter being coupled to a junction between the two batteries without a sense resistor between the switching converter and the junction between the two batteries, the output of the switching converter being responsive to the output of the logic block to cause the output of the switching converter to source or sink current as required to keep the two batteries at the same state of charge.

16. The balancing circuit of claim 15 wherein the batteries are of the same chemistries but of different capacities.

17. The balancing circuit of claim 15 wherein the batteries are of different chemistries.

18. The balancing circuit of claim 15 wherein the output of the logic block causes the output of the switching converter to source or sink current as required to keep the two batteries at the same state of charge within a predetermined difference.

19. The balancing circuit of claim 18 wherein the output of the logic block comprises first and second signals, the first signal being an enable signal to enable the switching converter and the second signal being a source/sink signal to cause the output of the switching converter to source or sink current.

20. The balancing circuit of claim 15 wherein a sense resistor is coupled in series with the batteries, and wherein the voltage based fuel gauges include a Coulomb counter.

21. A balancing circuit for a hybrid battery having at least two different rechargeable batteries coupled in series having one terminal coupled to ground and one terminal coupled as a battery output of the two batteries comprising:
 a plurality of voltage based fuel gauges that each use a battery model, one coupled to each battery for determining a state of charge of the respective battery;
 a logic block coupled to an output of each fuel gauge for determining when the state of charge of the two batteries is different and providing an output having first and second signals, the first signal being an enable signal and the second signal being a source/sink signal to cause an output of a switching converter to source or sink current;
 the switching converter coupled between the battery output and the ground and being capable of sourcing and sinking current, inputs to the switching converter being coupled to the output of the logic circuitry, the output of the switching converter being coupled to a junction between the two batteries, the output of the switching converter being responsive to the output of the logic block causing the output of the switching converter to source or sink current as required to keep the two batteries at the same state of charge within a predetermined difference.

22. The balancing circuit of claim 21 wherein the batteries are of the same chemistries but of different capacities.

23. The balancing circuit of claim 21 wherein the batteries are of different chemistries.

24. The balancing circuit of claim 21 wherein a sense resistor is coupled in series with the batteries, and wherein the fuel gauges include a Coulomb counter.

25. A method of balancing two different batteries that are coupled in series comprising:
 coupling a voltage based fuel gauge that uses a battery voltage model to each battery to determine a state of charge of each battery;
 comparing the state of charge of the two different batteries, and
 a) if the state of charge of the two different batteries is more than a predetermined difference, then enabling a switching converter to source current to a node between the two different batteries or to sink current from the node between the two different batteries without a sense resistor between the switching converter and the node between the two different batteries, as required to tend to equalize the state of charge of the two different batteries;
 b) if the state of charge of the two different batteries is equal within a predetermined allowance, then disabling the switching converter.

* * * * *